Feb. 7, 1967

K. J. HECKER 3,303,271

ROTARY SHUTTER ARRANGEMENT PROVIDING A
PLURALITY OF FRAME RATES
Filed May 21, 1964

KLAUS J. HECKER
INVENTOR.

BY

ATTORNEY

United States Patent Office 3,303,271

Patented Feb. 7, 1967

3,303,271

ROTARY SHUTTER ARRANGEMENT PROVIDING A PLURALITY OF FRAME RATES

Klaus J. Hecker, Riverside, Calif., assignor to the United States of America as represented by the Secretary of the Navy

Filed May 21, 1964, Ser. No. 369,333
7 Claims. (Cl. 178—5)

The invention herein described may be manufactured and used by or for the Government of the United States of America for governmental purposes without the payment of any royalties thereon or therefor.

The present invention relates to optical shutters and more particularly to a shutter arrangement which can provide two different frame rates.

Prior systems which provide a change in frame rate are more complex than the instant device. The present invention uses two rotating shutters, each having a plurality of apertures, wherein one shuttering disc is capable of being moved through a given angle with respect to the other to change the frame rate.

In order to avoid smear in a low frame rate system, a shuttering arrangement is required which will expose a light sensitive image pickup tube, for instance, only for a short period of time; also, the shutter must be synchronized to the frame rate of the system in which it is used. Consequently, if the frame rate of the system is changed, the shuttering rate would also have to be changed.

It is an object of the invention to provide a shutter arrangement which permits two different frame rates.

Another object is to provide a shutter arrangement permitting a plurality of frame rates.

Another object of the invention is to provide a simple dual rate rotating shutter arrangement.

A further object of the invention is to provide a dual rate shutter arrangement for use in electro-optical video systems.

Other objects and many of the attendant advantages of this invention will become readily appreciated as the same becomes better understood by reference to the following detailed description when considered in connection with the accompanying drawings wherein.

Figures 1, 2, 3, 4:
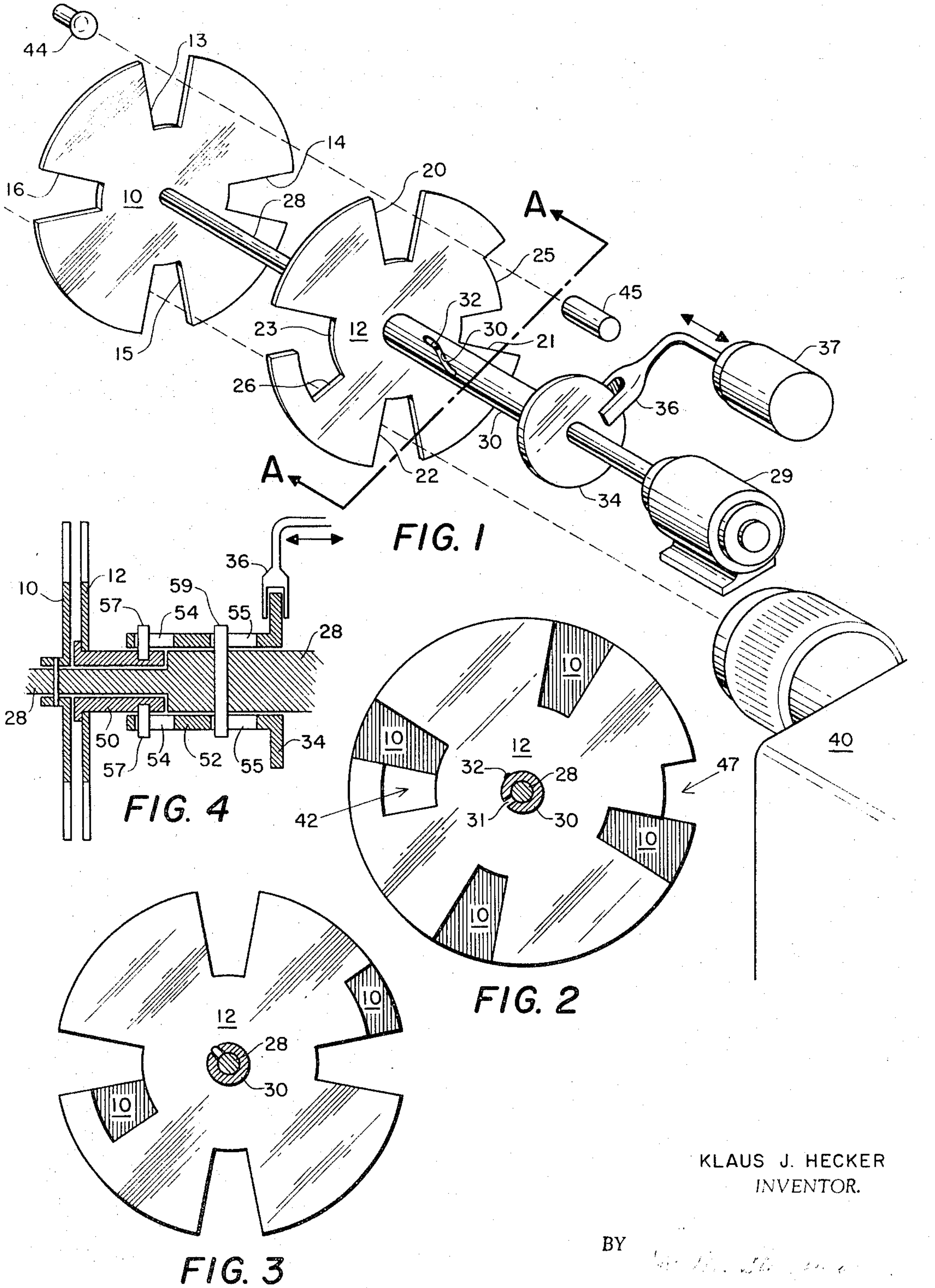
FIG. 1 shows a particular embodiment of the invention using a pair of shuttering discs.
FIG. 2 is an axial view of the device of FIG. 1 taken along line A—A with only one frame slit open.
FIG. 3 is an axial view of the device of FIG. 1 taken along line A—A with the discs rotated in relation to each other such that all four frame slits are open.
FIG. 4 illustrates an additional means for movement of the shuttering discs in relation to each other.

The particular embodiment of the present invention as shown in the diagrammatic illustration of FIG. 1 uses two shuttering discs, disc 10 and disc 12. Disc 10 has four slots, slots 13, 14, 15 and 16, spaced 90° apart. Disc 12 also has four slots, slots 20, 21, 22 and 23, spaced 90° apart, and in addition slots 21 and 23 are made larger by removal of portions at 25 and 26 respectively. Discs 10 and 12 are rotatably mounted on a shaft or the like 28, which is driven by a synchronous motor 29, such that both discs are rotated at the same speed. Disc 12 is attached to one end of a sleeve 30 which slidingly fits over shaft 28. An angular slot 31 provided in sleeve 30 together with a pin 32 which is mounted on shaft 28, for example, operate to limit the amount disc 12 may be rotated in relation to disc 10. The other end of sleeve 30 is provided with a flange 34, for instance, which in conjunction with a forked arm 36 and solenoid 37 operates to move sleeve 30 and thus disc 12 longitudinally along shaft 28 with a limited amount of rotation at the same time, as can be seen from FIG. 1. As aforementioned, pin 32 and the configuration of angular slot 31 control the limits of rotation of disc 12 with respect to disc 10. Other suitable means may also be used to accomplish the change of position of one disc with respect to the other as later described herein.

When both discs, 10 and 12, are rotated by shaft 28 and drive means 29 at the same speed and are aligned as shown in FIG. 2, and image pickup tube or the like 40 will be exposed once during each revolution of the two discs through open area 42. However, if solenoid 37 or the like is actuated to move disc 12 with respect to disc 10 to the position in relation to each other as shown in FIGS. 1 and 3, pickup tube 40 will be exposed four times for each revolution of the discs.

It is possible to obtain frame synchronizing pulses from the circumference of the two discs since the number of notches at the circumference is equal to the number of exposures for each rotation. These synchronization pulses can be picked up by means of a light-source 44 and photocell 45 arrangement, for one example, as shown in FIG. 1. With the relative position of the discs as shown in FIG. 2, there is only one visible notch on the circumference of the two discs together; this is at 47. The depth of the notch at 47, FIG. 2, is such that it will not permit exposure of pickup means 40. This notch could be positioned to occur at a different location on the circumference of the discs if so desired; the embodiment shown is for convenience so as not to interfere with exposure of pickup means 40. In the position shown in FIG. 3 four notches are seen on the circumference of the discs.

The exposure time is the same for the two different frame rates provided by the positions shown in FIGS. 2 and 3 since the angular speed of the discs and the width of the slots does not change when switching from one frame rate to the other.

Another arrangement for rotatably moving disc 12 in relation to disc 10 without moving the disc longitudinally along shaft 28 is shown in FIG. 4. In such an arrangement the planes of discs 10 and 12 may be in close proximity to each other, as is the usual case. Disc 10 is mounted on the narrow diameter end of shaft 28, and disc 12 is mounted on a sleeve 50. Another sleeve 52 fits about a larger portion of shaft 28 and one end of sleeve 50, as shown. Sleeve 52 has a pair of longitudinal slots 54 and a pair of angular slots 55 therein. A pin 59 mounted on shaft 28 and protrudes through angular slots 55 for rotating sleeve 52 when the shaft is driven. Pins 57 which are mounted on sleeve 50 protrude through slots 54 for rotation of sleeve 50 and disc 12 with rotation of shaft 28 and sleeve 52.

Arm 36 operated by a means 37, like that shown in FIG. 1, when actuated moves only sleeve 52 longitudinally along shaft 28 but sleeves 50 and 52 and disc 12 will be moved angularly about shaft 28 due to pin 59 and angular slots 55. The amount of angular movement of disc 12 in relation to disc 10 will depend upon the degree of movement of arm 36, within the limits of the slot lengths of course.

Obviously many modifications and variations of the present invention are possible in the light of the above teachings. It is therefore to be understood that within the scope of the appended claims the invention may be practiced otherwise than as specifically described.

What is claimed is:

1. An optical shutter arrangement for providing a dual frame rate comprising:

(a) a pair of shuttering discs centrally mounted on a shaft means for rotation together at the same speed, (b) means for driving said shaft and discs at a desired speed, (c) both of said discs having an equal plurality of slots positioned circumferentially thereabout, (d) one of said discs, in addition, having a single one of said slots wider than the others, (e) actuatable means for rotatably moving said one disc about said shaft in relation to said other disc by an amount equal to the width of one of said plurality of slots, (f) where in a first position the slots in both discs being coincident with the exception of the wider portion of said one wider slot thus providing the same number of apertures for exposures upon each revolution as there are slots per disc, (g) where said discs are moved in relation to each other to a second position by actuation of said actuatable means only the wider portion of the wider slot of said one disc being coincident with one slot in said other disc thus providing only one exposure aperture.

2. A device as in claim 1 wherein said plurality of slots are equally spaced about said discs.

3. A device as in claim 1 wherein all slots, with the exception of said one wider slot, are the same size.

4. A device as in claim 3 wherein said wider slot is twice the width of the other slots.

5. A device as in claim 1 wherein means is provided to provide frame synchronizing pulses equal to the number of exposure apertures per revolution of the discs.

6. A device as in claim 1 wherein the size of the individual apertures in said first position is the same as the size of the aperture in said second position.

7. An optical shutter arrangement for providing a plurality of frame rates comprising:

(a) a pair of shuttering discs centrally mounted on a shaft means for rotation together at the same speed, (b) means for driving said shaft and discs at a desired speed, (c) said discs having a plurality of slots positioned circumferentially thereabout, (d) one of said discs in addition, having at least one of said slots wider than the others, (e) actuatable means for rotatably moving said one disc about said shaft in relation to said other disc by an amount equal to the width of one of said plurality of slots, (f) where in a first position the slots in both discs being coincident with the exception of the wider portion of said at least one wider slot thus providing the same number of apertures for exposures upon each revolution as there are slots per disc, (g) where said discs are moved in relation to each other by actuation of said actuatable means only the wider portion of the wider slot of said one disc being coincident with one slot in said other disc thus providing only one exposure aperture, and (h) the number of slots in both discs that are coincident can be changed by moving said one disc about said shaft in relation to said other disc depending upon the amount of relative movement between discs, thereby changing the number of apertures for exposures upon each revolution and thus the frame rate.

References Cited by the Examiner

UNITED STATES PATENTS 3,232,690 2/1966 McKee et al. ______ 352—216 X

DAVID G. REDINBAUGH, *Primary Examiner.*

R. L. RICHARDSON, *Examiner.*